J. J. GREENOUGH.

UNIVERSAL JOINTED ARM.

No. 10,278. Reissued Jan. 30, 1883.

WITNESSES

Franck L. Durand

" Wm. L. Spridew.

INVENTOR

J. J. Greenough

Attorney

UNITED STATES PATENT OFFICE.

JOHN JAMES GREENOUGH, OF SYRACUSE, NEW YORK.

UNIVERSAL-JOINTED ARM.

SPECIFICATION forming part of Reissued Letters Patent No. 10,278, dated January 30, 1883.

Original No. 258,576, dated May 30, 1882. Application for reissue filed January 5, 1883.

*To all whom it may concern:*

Be it known that I, JOHN JAMES GREENOUGH, a citizen of the United States, residing in Syracuse, Onondaga county, State of New York, have invented certain new and useful Improvements in the Construction of Universal-Jointed Arms and Shafts for Driving Brushes and other Working-Tools, of which the following is a specification.

Heretofore I have obtained Letters Patent for jointed arms and revolving shafts for conveying power in any direction for sundry purposes, which in practice have been found to have defects in construction, for the best results, which, at great expense of time and money, I have obtained by means of several important additions and improvements in construction; and I have also devised a new form of joint that may be used as a substitute for my globe-gear, in combination with said arms under certain conditions. The following is a description of my said improvements, referring to the accompanying drawings, in which—

Figure 1:
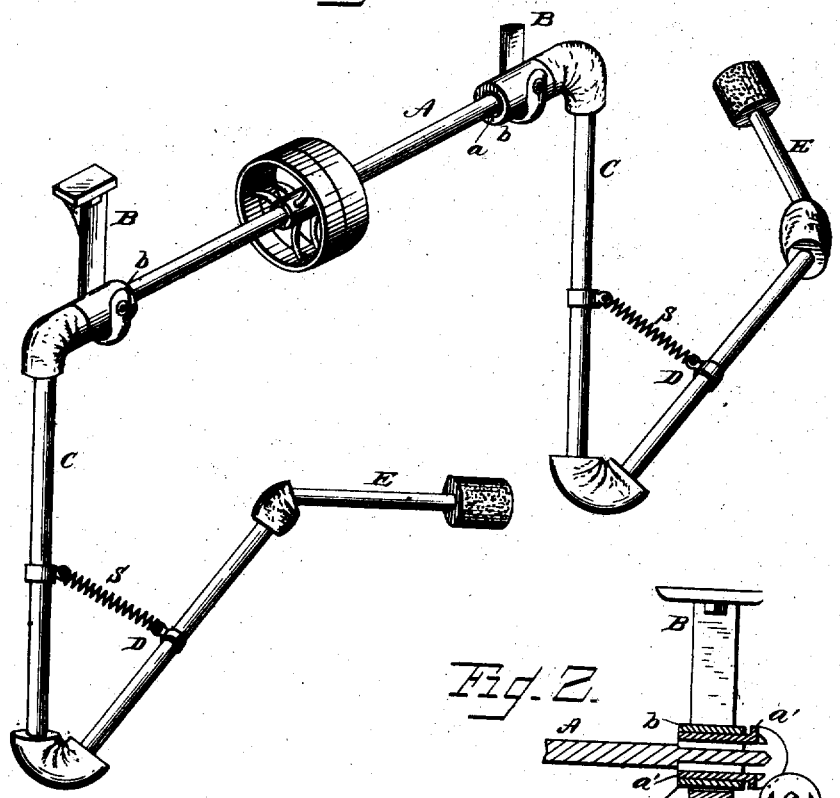
Figure 2:
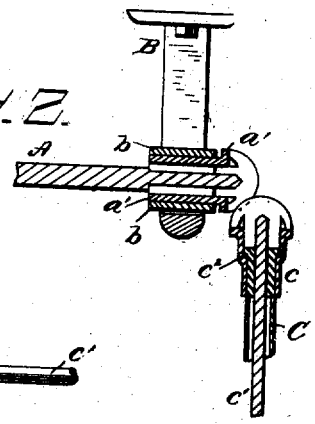
Figure 2:
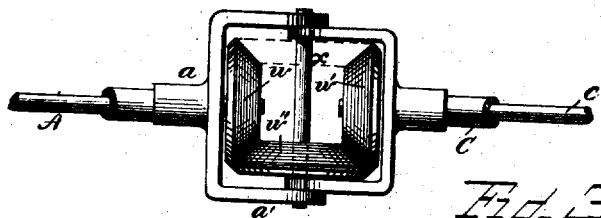
Figure 3:
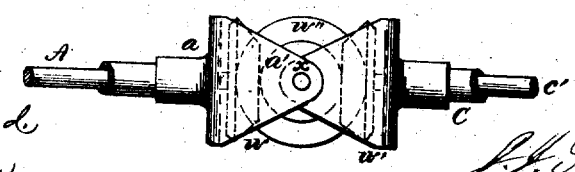

Figure 1 is a general view of the apparatus fitted up for horse-grooming. Fig. 2 is a detail of the first swivel-joint and its connection with the hanger and upper portion of the first section C of the jointed arm; Fig. 3, my new bevel-gear universal joint.

The main or driving-shaft A is supported by hangers B, attached to a permanent support above in proper position. In these hangers are collars *b*, of ordinary form, into each of which a box or bearing, *a*, is fitted so as to be supported by said collar, in which it is free to turn. These boxes *a* form the bearings in which the shaft A revolves. To this box *a* the arm-section C is suspended from the hanger without bearing on the shaft A, which has a gear-wheel that drives the arm-shaft $c'$, affixed to its end. The section C of the pendent arm has a swivel at the joint at *c* or elsewhere. (See Fig. 2.) The arm-section C has a flange, $c^2$, on it that fits a recess in the joint-section *c*, whereby it is supported with freedom to turn on its axis and carry arm-section D, jointed thereto, around with it. The tubular section C has boxes or bearings fitted into it at its ends that form journal-bearings for the shaft $c'$ to run in, the tube covering the shaft, revolving therein from the joint at one end of the shaft to the other. The tubular arm-section C is affixed in the socket of the coupling-joint at the opposite end to the swivel, there being a stationary coupling joint section and a swiveling-section on each section of the arm, so constructed as to sustain each succeeding arm-section coupled thereto independent of the shaft running within and revolving the brush. Thus arranged and coupled together, the arm-sections form a universally-moving pendent arm suspended from a stationary hanger, and the revolving shafts, being supported in bearings in the arm-sections, do not sustain any part of the weight of the arm, and, being geared at the joints, revolve in any position in which they can be placed from vertical to horizontal around the circle. All the joints are made in substantially the same way, the swivel arrangement being identical for either gear.

In the drawings, Fig. 1, I show three joints between the driving-shaft and the working brush or tool, which I have found the best number for practical purposes generally, representing, as they do, the joints of the human arm; but the arms and revolving shafts may vary, the feature being retained of the pendent arm with universal joint or joints supported from a stationary hanger above. To relieve the weight of the arm D in some degree in the hands of the operator, a spring, *s*, may be attached to the upper section of the arm C and connected with the forearm D, so as to hold it up, and thus relieve the operator of much of the weight of the working-brush or other tool. In this case the elbow-joint should be made without a swivel, to prevent the spring *s* from becoming twisted around the arm-sections C D, which run freely in their bearings, the weight of the arm D being supported by the hanger through the pendent arm C. The arm or tube D carries a shaft within it, that runs in boxes in arm D, like those previously described in arm C. The shaft in arm D is coupled with the preceding and succeeding shafts, more or less of which may be used, as required, for the purpose intended. The gearing used in these shaft-sustaining tubular arms and couplings may be the semi-spherical gear heretofore patented by me, forming a universal joint or a combination of bevel-gears and swivel that forms my new universal joint, devised to connect the ends of movable shafts together with a universal movement. The lastnamed joint is shown in Fig. 3. On the end of the main shaft a bevel-gear, *w*, is keyed, and a like one, *w'*, on the end of the second shaft. Into these, bevel-wheel *w''* gears at right angles, that connects them. This may be of the same size, but preferably larger than those on the shafts. The arrangement is clearly shown in Fig. 3. Two arms or projections, *a*, extend out from the swivel and other joint-section on each side of the bevel-gear *w w'*, meeting at the center or axis of wheel *w''*, where they lap and are pivoted together, the axis or journal-pin of the bevel-wheel *w''* forming the pivot therefor on which the arms turn to deflect them when the forearm or section D is turned to the right or left. At the handle or wrist-joint E, where the brush or other tool is held by the hand and directed and applied to its work, there is a swivel connecting the joint with the section D to give it perfect freedom of action in all directions.

In the drawings, Fig. 1, there are two pendent jointed arms, C D E, coupled one at each end of the shaft A, by which arrangement the brushes or tools are caused to revolve in opposite directions when brought in contact with a horse or other object between them, so that an animal standing between them can be brushed properly in the same direction on both sides.

Having thus fully described my present sectional jointed arms and shafts driven from stationary supporting-hangers, I claim—

1. A pendent jointed and swiveling arm carrying a shaft for revolving the brush or other tool, the shaft being supported substantially as described, so that said shaft will sustain no part of the weight of the arm, as herein set forth.

2. The combination of the upper section, C, of the arm and the section D with the spring *s*, in the manner set forth, to assist in holding up the arm-section D, as herein specified.

3. The boxes or bearings at each end of the tubes, comprising the sections of the arms in which the shafts turn, and by which the shafts are supported and held independent of the arm-couplings.

4. The bevel-gear, arranged and combined as herein specified, in combination with the couplings, forming a universal joint in the manner and for the purposes specified.

5. The combination, as hereinbefore set forth, of the two pendent arms supported by hangers with a driving-shaft by which the arm-shafts are revolved so as to cause the brushes or other tools to rotate in opposite directions, as and for the purposes set forth.

JOHN JAMES GREENOUGH.

Witnesses:

EDWIN DICKSON,

JOHN WORDEN.